United States Patent [19]

Noel

[11] Patent Number: 4,787,666

[45] Date of Patent: Nov. 29, 1988

[54] STREAMLINING AIRFOIL FOR VEHICLES

[76] Inventor: Phares A. Noel, 2435 W. Boston Blvd., Detroit, Mich. 48206

[21] Appl. No.: 123,956

[22] Filed: Nov. 23, 1987

[51] Int. Cl.$^4$ .............................................. B62D 35/00
[52] U.S. Cl. .................................. 296/180.1; 296/91; 296/95.1; 296/96.11; 296/96.2
[58] Field of Search ...................... 296/15, 84 R, 84 A, 296/84 C, 84 D, 91, 92, 95 R, 95 C, 95 Q

[56] References Cited

U.S. PATENT DOCUMENTS 4,043,586 8/1977 Hafer.
4,131,309 12/1978 Henke.
4,262,954 4/1981 Thompson.
4,311,334 1/1982 Jenkins.

*Primary Examiner*—Johnny D. Cherry
*Assistant Examiner*—Brian Sells
*Attorney, Agent, or Firm*—Henderson & Sturm

[57] ABSTRACT

An apparatus for improving the aerodynamic performance of vehicles of a type having a windshield, a radiator for cooling engine coolant, a grille extending in front of the radiator for allowing air to enter the radiator and a hood extending from the top of the grille to the bottom of the windshield. A transparent airfoil extends from the front portion of the hood to the top of the windshield and from one side of the hood to the other side thereof.

10 Claims, 3 Drawing Sheets

STREAMLINING AIRFOIL FOR VEHICLES

TECHNICAL FIELD

The present invention relates generally to an airfoil structure for streamlining vehicles and more particularly to a transparent airfoil which mounts over the hood and windshield of a truck.

BACKGROUND ART

It is well known that streamlined vehicles are more efficient and use less fuel than non-streamlined vehicles. Much work has been done in recent years to streamline vehicles.

Wind deflector attachments have been developed and are in common usage for the top of truck cabs for directing air over the top of trailers attached thereto.

A major obstacle to the streamlining of vehicles is that the windshields on most trucks are more vertical than horizontal, thereby causing considerable wind resistance. U.S. Pat. No. 4,262,954 to Thompson, patented in 1981, proposes to use a small wind deflector mounted above the grille of a truck in an attempt to overcome this problem. To date, however, such devices are not in common usage.

Consequently, there exists a need for an apparatus to streamline windshields of vehicles without interfering with the vision of the driver and of those in the passenger compartment.

DISCLOSURE OF THE INVENTION

The present invention relates to an apparatus for improving the aerodynamic performance of vehicles of a type having a windshield, a radiator for cooling engine coolant, a grille extending in front of the radiator for allowing air to enter the radiator and a hood extending from the top of the grille to the bottom of the windshield. A transparent airfoil extends from the front portion of the hood to the top of the windshield and from one side of the hood to the other side thereof.

An object of the present invention is to provide an improved streamlining apparatus for vehicles.

Another object of the present invention is to provide a streamlining apparatus to streamline the windshield portion of vehicles.

A further object of the present invention is to provide an apparatus of the aforementioned type which is economical to produce and dependable in its use.

Other objects, advantages, and novel features of the present invention will become apparent from the following detailed description of the invention when considered in conjunction with the accompanying drawings.

BEST MODES FOR CARRYING OUT THE INVENTION

Figure 1:
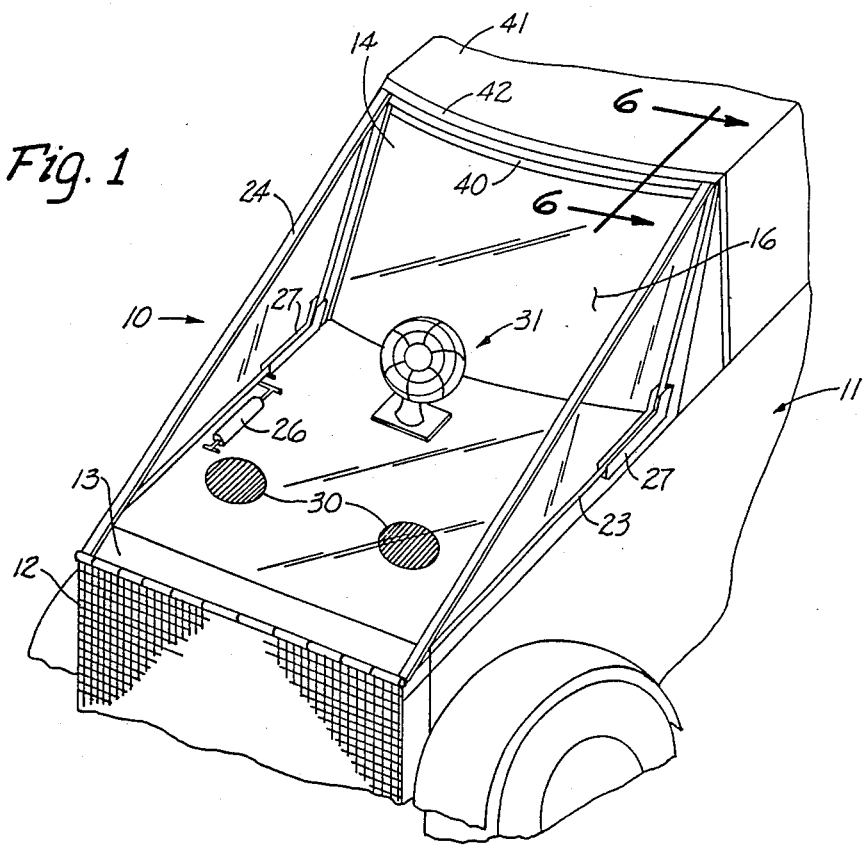
FIG. 1 is a partial perspective view of a preferred embodiment of the present invention attached to a large semi-trailer truck.

Referring now to the drawings wherein like reference numerals designate identical or corresponding parts throughout the several views, FIG. 1 shows an airfoil (10) constructed accordance with the present invention and being attached to a truck (11).

Figure 2:
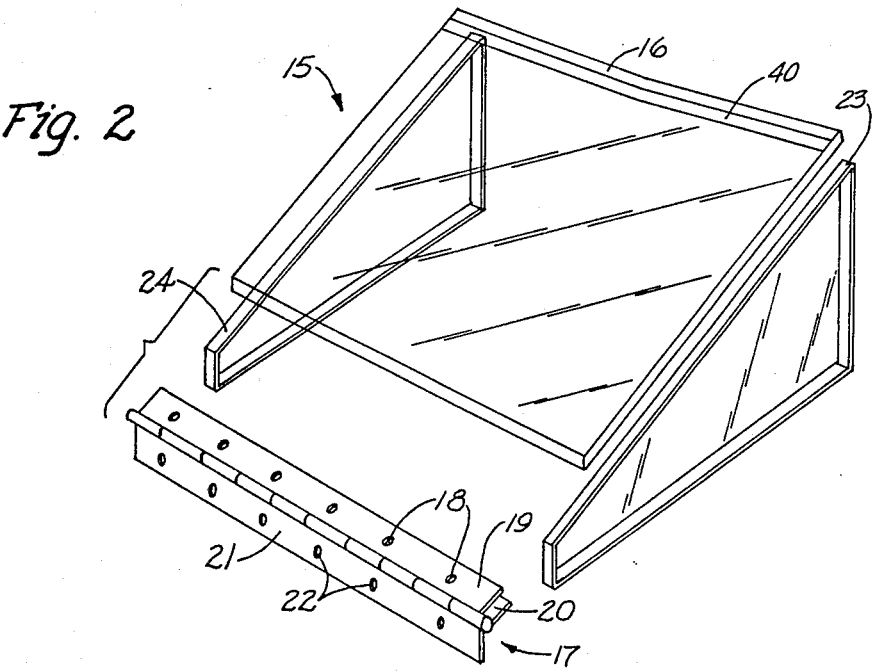
FIG. 2 is an exploded perspective view of the preferred embodiment shown in FIG. 1.

The truck (11) includes a grille (12) having a radiator just inside of it. A hood (13) covers the engine compartment of the truck and the truck has a windshield (14). A transparent airfoil (15) is shown in FIG. 2.

The primary component of the airfoil (15) is a large, flat sheet of Lexan, which is basically a bullet proof Plexiglas. The front of the transparent sheet (16) is pivotally attached to the hood (13) above the radiator (12) by a piano hinge (17). Fasteners (not shown) extend through openings (18) in the piano hinge and through openings (not shown) in the front portion of the transparent sheet (16). The front of the piano hinge (18) forms a slot between members (19) and (20) into which the front of the transparent sheet (16) fits. Another portion (21) of the piano hinge is bolted to the hood by fasteners (not shown) extending through openings (22) in the member (21) and through openings (not shown) in the hood (13). Bracing frames (23) and (24) are connected, such as by gluing, to the edges of the sheet (16) to form an integral unit that can be pivoted upwardly or downwardly, for example as shown in FIG. 4.

Figure 4:
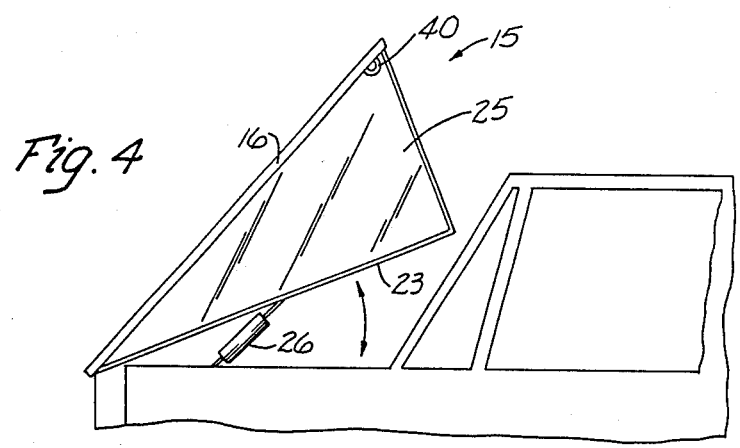
FIG. 4 is a side elevational view showing pneumatic or gas filled struts for pivoting the preferred embodiment between an open and a closed position thereof.

The frames (23) and (24) can be open to allow air the pass therethrough or they can be closed by placing another piece of Lexan (25) within the frames (23) and (24), as is shown in FIG. 4.

Hydraulic, pneumatic or gas-filled cylinders (26) are pivotally attached at one end thereof to the hood (13) and pivotally attached at the other end thereof to a portion of one of the frames (23) or (24) for allowing the operator to move the airfoil structure (15) between a first position shown in FIG. 1 and a second position shown in FIG. 4. This raised position is often necessary in order to be able to open the hood (13) of the truck.

Figure 3:
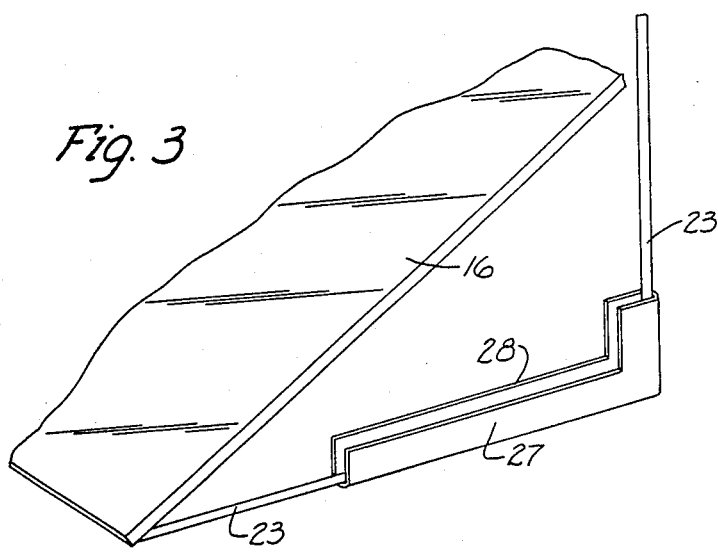
FIG. 3 is an enlarged perspective view of one side of the preferred embodiment and showing a locking device for holding the streamlining airfoil in place.

Referring to FIG. 3, it is noted that the frame (23) can be locked into the position shown in FIG. 1 by providing locking strips (27) which have a slightly smaller slot (28) therein than the width of the frames (23). Consequently, when the airfoil (15) is moved the position shown in FIG. 1, the airfoil can be locked in such position by friction once the frame (23) is pushed into the slot (28) of the locking mechanism (27). The locking mechanism (27) would be permanently bolted to the portion of the truck just outside of the hood (13) or alternatively it could be connected directly to the hood (13).

Referring to FIG. 1, it is noted that vents (30) are disposed in the hood (13) and are connected to a manifold and blower (not shown) to supply a heat source for defrosting the interior of the airfoil (15). One or more oscillating fans (31), which are electrically operated, are attached to the hood (13) to blow air onto the windshield (14) and/or the interior of the sheet (16) in the space between the transparent sheet (16) and the windshield (14).

Figure 5:
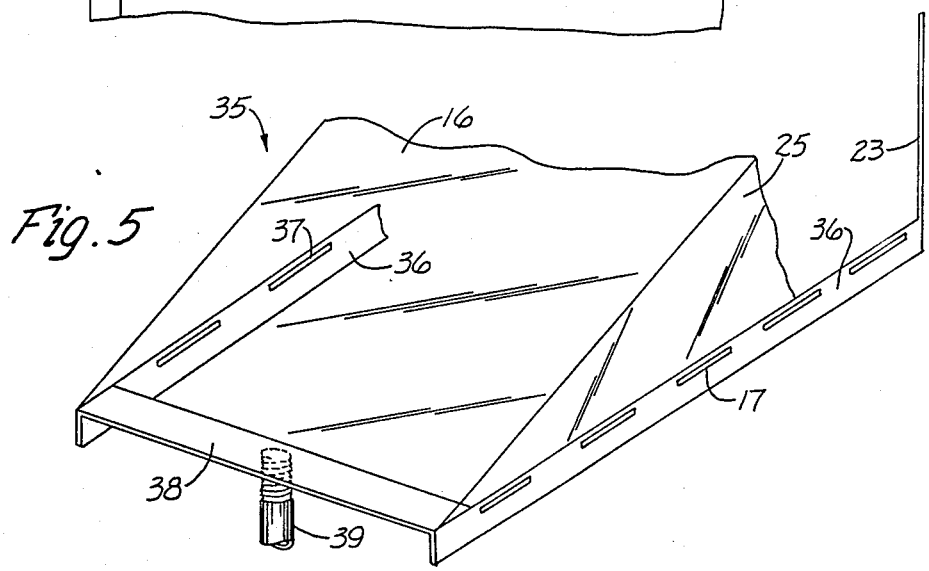
FIG. 5 is another embodiment of the present invention showing vents along the side and a hose leading from a blower to the space between the windshield and the airfoil.

Referring now to FIG. 5, it is noted that a second embodiment (35) is shown utilizing a transparent sheet (16), just like in the previous embodiments, but that the frame (23) includes a member (36) at the bottom thereof having a plurality of vent openings (37). These brackets (36) are tied together by a member (38), which also connects to the transparent sheet (16).

A flexible, clear plastic tubing (39) connects to the heating and defogging system, including a blower (not shown). The sides (25) in this embodiment are be sealed closed. When the blower (not shown) blows air up through the tubing (39), it will pass through an opening in the hood (13) and into the space between the airfoil (35) and the windshield (14). The heated air will eventually pass out through openings (37). If the vents (37) were not present, circulation would not occur.

Figure 6:
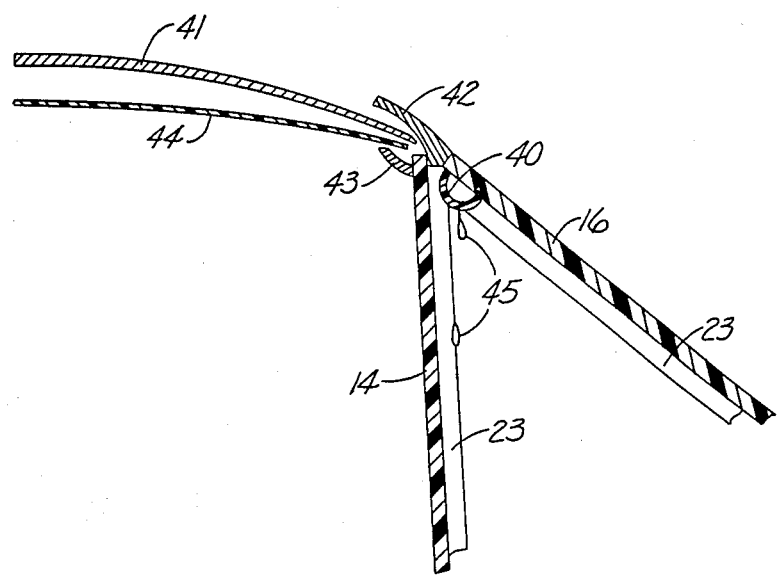
FIG. 6 is a cross-sectional view taken along line 6—6 of FIG. 1, showing a drip shield.

Referring to FIG. 6, it is noted that a drip shield (40) is glued to the top inside of the transparent sheet (16). Preferably the drip shield is in the form of a transparent tube cut in half along a diameter thereof. The drip shield (40) extends completely across the top of the transparent sheet (16) as drawn in FIGS. 1 and 2. If water leaks between the trim strips (42) and the transparent sheet (16), it would not run down the inside of the transparent sheet (16), but will drip down onto windshield (14) wherein the normal windshield wipers (not shown) of a standard vehicle can be used to wipe them off. Alternatively, the drip strip (40) can be located to the right of where it is shown in FIG. 6, so it will drip on the hood of the vehicle (11) instead of the windshield (14).

The top (41) of the vehicle (11) as shown in FIG. 6, has a cloth or vinyl headliner (44) and a trip strip (43) holding it in place as is standard in most vehicles.

One or more large windshield wipers can be mounted on the outside of the transparent sheet (16) to keep it clear of moisture during inclement weather. Also, standard windshield washers can optionally be installed to selectively spray washing fluid on the top of the transparent sheet (16) so that the optional wipers can then clean the top surface thereof.

Obviously, many modifications and variations of the present invention are possible in light of the above teachings. It is therefore to be understood that, within the scope of the appended claims, the invention may be practiced otherwise than as specifically described.

I claim:

1. Apparatus for improving the aerodynamic performance of vehicles comprising:
   a vehicle including:
      a windshield, said windshield having a top, bottom, and sides;
      a radiator for cooling an engine coolant;
      a grille extending in front of said radiator for allowing air to enter said radiator;
      a hood extending from the top of said grille to the bottom of said windshield, said hood having a front portion located above said grille, a rear portion adjacent to the bottom of said windshield and two side portions generally overlying the front wheels of the vehicle; and
   a transparent airfoil extending from the front portion of said hood to the top of the windshield and from one side of the hood to the other side thereof, said airfoil having an interior and an exterior.

2. The apparatus of claim 1 including:
   hinge means for pivotally attaching the front of the airfoil to the front of the hood.

3. The apparatus of claim 2 including:
   means attached to said airfoil and to said hood for moving said airfoil between a first position against said hood and a second position away from said hood.

4. The apparatus of claim 3 including:
   means for selectively locking said airfoil into said first position thereof.

5. The apparatus of claim 1 including:
   means for sealing the airfoil to the top and sides of the windshield and the front portion and side portions of said hood.

6. The apparatus of claim 1 including:
   means attached to said hood for defrosting the interior of the airfoil.

7. The apparatus of claim 6 including:
   an air space being formed between the airfoil and the windshield.

8. The apparatus of claim 7 wherein said defrosting means comprises:
   means for forming vents in the lower side edges of said airfoil; and
   means for introducing heated air through said hood and into said air space.

9. The apparatus of claim 7 wherein said defrosting means comprises at least one opening in said hood for allowing heated air to flow into said air space and air circulating means for causing air movement within said air space.

10. The apparatus of claim 9 including a drip shield attached to the top underside of said transparent airfoil.

* * * * *